United States Patent
Ogawa et al.

(10) Patent No.: US 9,329,319 B2
(45) Date of Patent: May 3, 2016

(54) VEHICULAR DISPLAY APPARATUS

(71) Applicants: DENSO CORPORATION, Kariya, Aichi-pref. (JP); Honda Motor Co., Ltd., Tokyo (JP)

(72) Inventors: Naoto Ogawa, Kariya (JP); Takuo Yamamoto, Kariya (JP); Mika Kasai, Wako (JP); Ryo Kobe, Wako (JP)

(73) Assignees: DENSO CORPORATION, Kariya, Aichi-pref. (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/311,693

(22) Filed: Jun. 23, 2014

(65) Prior Publication Data

US 2014/0376262 A1 Dec. 25, 2014

(30) Foreign Application Priority Data

Jun. 25, 2013 (JP) ................. 2013-133034

(51) Int. Cl.
| | |
|---|---|
| *B60Q 3/00* | (2006.01) |
| *G02B 6/42* | (2006.01) |
| *F21V 8/00* | (2006.01) |
| *B60K 37/02* | (2006.01) |
| *B60Q 3/04* | (2006.01) |

(52) U.S. Cl.
CPC ............... *G02B 6/001* (2013.01); *B60K 37/02* (2013.01); *B60Q 3/004* (2013.01); *B60Q 3/044* (2013.01); *G02B 6/002* (2013.01); *G02B 6/0018* (2013.01); *G02B 6/0058* (2013.01)

(58) Field of Classification Search
CPC .. F21V 2200/00–2200/40; B60Q 3/002–3/005
See application file for complete search history.

(56) References Cited

U.S. PATENT DOCUMENTS

| 6,594,417 | B1 * | 7/2003 | Hulse ............................. 385/31 |
| 8,956,026 | B2 * | 2/2015 | Bungenstock ............... 362/511 |
| 2005/0213351 | A1 * | 9/2005 | Yang ............................ 362/633 |
| 2008/0291695 | A1 | 11/2008 | Okayasu et al. |
| 2010/0080010 | A1 * | 4/2010 | Marui et al. .................. 362/488 |
| 2013/0272006 | A1 * | 10/2013 | Yang ............................ 362/488 |

(Continued)

FOREIGN PATENT DOCUMENTS

| JP | 57-130298 | 2/1956 |
| JP | 02-146320 | 12/1990 |

(Continued)

OTHER PUBLICATIONS

Office Action dated Feb. 3, 2015 in corresponding Japanese Application No. 2013-133034.

(Continued)

*Primary Examiner* — Mariceli Santiago
(74) *Attorney, Agent, or Firm* — Harness, Dickey & Pierce, P.L.C.

(57) ABSTRACT

A vehicular display apparatus includes a light source and a light guide member. The light guide member includes (i) an interior portion that receives light from the light source and (ii) outer faces that reflect the light repeatedly to permit the light to propagate in the interior portion. The light guide member further includes a viewable portion and a light absorption member serving as a light attenuation portion. The viewable portion reflects a part of the light propagating in the interior portion towards a viewer side so as to appear to be luminous. The light absorption member absorbs a part of light reflected by the outer face.

15 Claims, 6 Drawing Sheets

(56) References Cited

U.S. PATENT DOCUMENTS

| | | | |
|---|---|---|---|
| 2013/0314945 A1 | 11/2013 | Fukutani | |
| 2014/0016347 A1 | 1/2014 | Okuda et al. | |
| 2014/0029292 A1* | 1/2014 | Mizushiro et al. | 362/565 |
| 2014/0078772 A1* | 3/2014 | Gaydoul et al. | 362/555 |
| 2014/0286029 A1* | 9/2014 | Mueller | 362/511 |

FOREIGN PATENT DOCUMENTS

| | | |
|---|---|---|
| JP | 2004-301688 | 10/2004 |
| JP | 2006-003431 | 1/2006 |
| JP | 2008-128716 | 6/2008 |
| JP | 2012-117913 | 6/2012 |
| JP | 2012-144146 | 8/2012 |
| JP | 2012-188045 | 10/2012 |
| WO | WO 2012/108101 | 8/2012 |
| WO | WO 2012/124570 | 9/2012 |

OTHER PUBLICATIONS

Office Action mailed Jun. 9, 2015 in corresponding Japanese Application No. 2013-133034.

* cited by examiner

VEHICULAR DISPLAY APPARATUS

CROSS REFERENCE TO RELATED APPLICATION

The present application is based on Japanese Patent Application No. 2013-133034 filed on Jun. 25, 2013, the disclosure of which is incorporated herein by reference.

TECHNICAL FIELD

The present discloser relates to a vehicular display apparatus to permit a part of a light guide member to be viewable for a decorative use.

BACKGROUND ART

Patent Literature 1: JP 2008-128716 A

Patent Literature 1 discloses a vehicular display apparatus provided with a light guide member surrounding a liquid crystal display portion. This light guide member receives light from a light source and outputs the light towards a viewer side from a predetermined light output portion. This configuration illuminates the light output portion, which is adjacent to a periphery of the liquid crystal display portion, while decorating the liquid crystal display portion.

A recent vehicular display apparatus has been required to provide a gradation display to the light output portion as changing a luminance gradually depending on the positional change. The present inventors examined the shape of a light guide member to change luminance gradually depending on positional change. The present inventors found it not easy to achieve a desired luminance change characteristic line that expresses a relationship between a luminance and a distance from a light source in the light output portion.

SUMMARY

It is an object of the present disclosure to provide a vehicular display apparatus simplifying a high accurate adjustment of a desired luminance change characteristic line into a desired form.

To achieve the above object, according to an example of the present disclosure, a vehicular display apparatus in a vehicle is provided to include a light source and a light guide member. The light source emits light. The light guide member includes an interior portion that receives light from the light source, and outer faces that reflect the light repeatedly to permit the reflected light to propagate in the interior portion. The light guide member further includes a viewable portion and a light attenuation portion. The viewable portion reflects a part of the light propagating in the interior portion towards a viewer side so as to appear to be luminous. The light attenuation portion absorbs or diffuses the light reflected by the outer faces.

According to the above configuration, the light guide member has a light attenuation portion that absorbs or diffuses the light reflected by the outer face. Therefore, the outer face provided with the light attenuation portion reflects the light of which a luminance falls greatly. A part of the viewable portion reflects the light of which a luminance falls; this part of the viewable portion appears with a low luminance. Adjusting a range having the light attenuation portion in the light guide member enables the adjustment of the luminance change characteristic line that represents the relation between the position and luminance in the viewable portion. This is easier than adjusting a luminance change characteristic line only with the shape of the light guide member; this facilitates the adjustment of the luminance change characteristic line to a desired form with a high accuracy.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Figure 1:
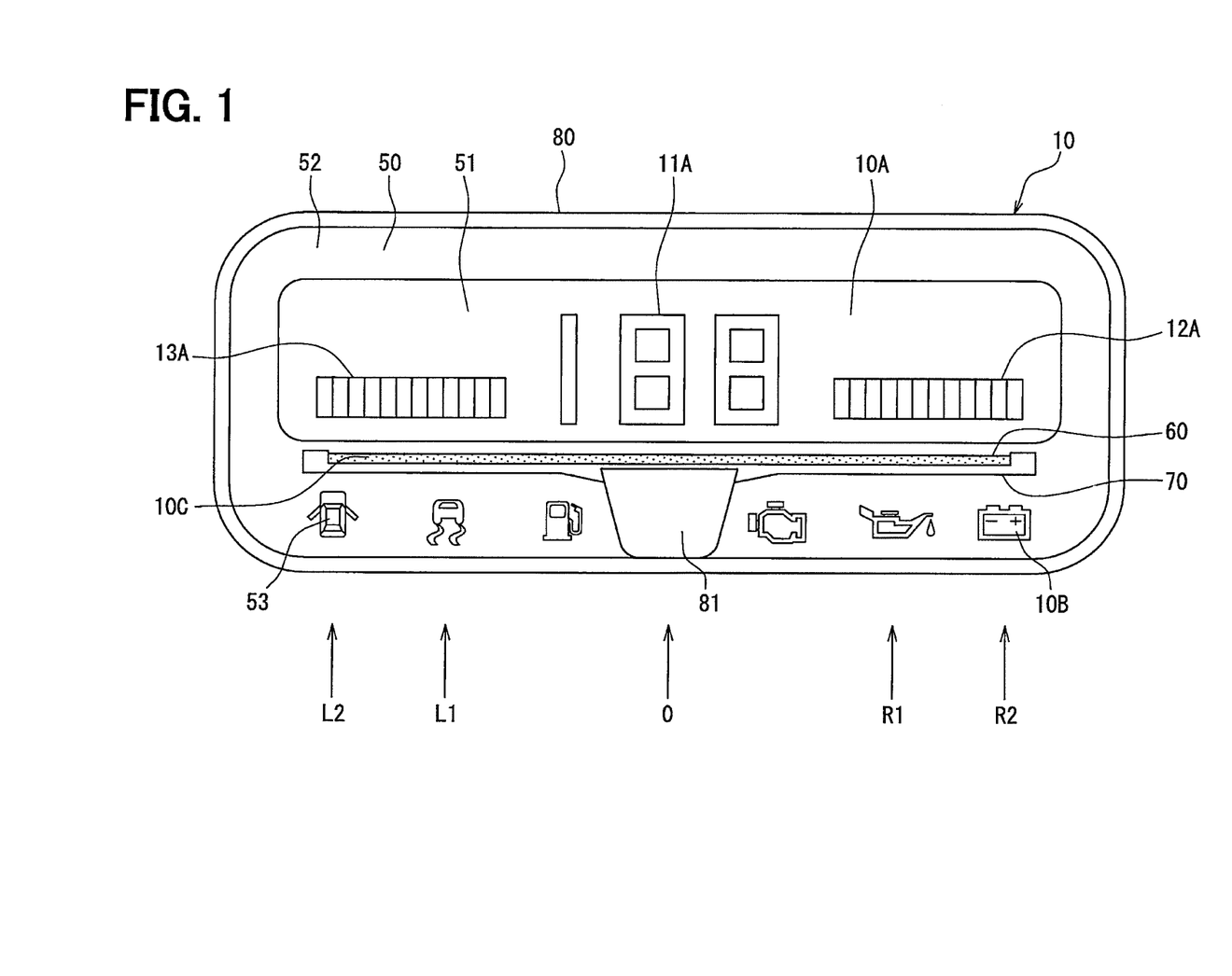
FIG. 1 illustrates a front view of a vehicular display apparatus according to an embodiment of the present disclosure.

The following explains a vehicular display apparatus in a vehicle according to an embodiment of the present disclosure with reference to drawings. This display apparatus displays various kinds of vehicle information, such as vehicle speed, remaining fuel, engine speed, anomaly occurrence; the apparatus is attached to an instrument panel of the vehicle to be viewed by a driver (i.e., viewer) of the vehicle. FIG. 1 is a front view that is viewed from a viewer side (the side of the viewer or driver).

The display apparatus includes a liquid crystal display portion 10A, an alarm display portion 10B, and a decorating display portion 10C. The liquid crystal display portion 10A includes display regions 11A, 12A, 13A for displaying a vehicle speed, remaining fuel, and engine speed, respectively. The liquid crystal display portion 10A is displayed by a liquid crystal display unit 40, which will be mentioned later; therefore, the display manner can be easily changed. For example, the background color of the display regions 11A, 12A, 13A can be changed; the display of vehicle information with digital numerals can be changed to the display of vehicle information with a pointer rotating.

The alarm display portion 10B reports an anomaly to the driver or viewer when the anomaly arises in the vehicle. The decorating display portion 10C corresponding to the part illustrated with dots in FIG. 1 outputs light towards the viewer to thereby permit the part of dots to appear to be luminous. The decorating display portion 10C is arranged in between the liquid crystal display portion 10A and the alarm display portion 10B to decorate the display apparatus.

In FIG. 1, the sign O indicates a center position in a longitudinal (left-and-right) direction of the display apparatus; the signs L1 and L2 and the signs R1 and R2 indicate positions in the left and right directions or sides on a basis of the center position O, respectively. The decorating display portion 10C provides a gradation display such that the center position O is highest in luminance while the luminance decreases gradually as a distance from the center position O increases.

Figure 2:
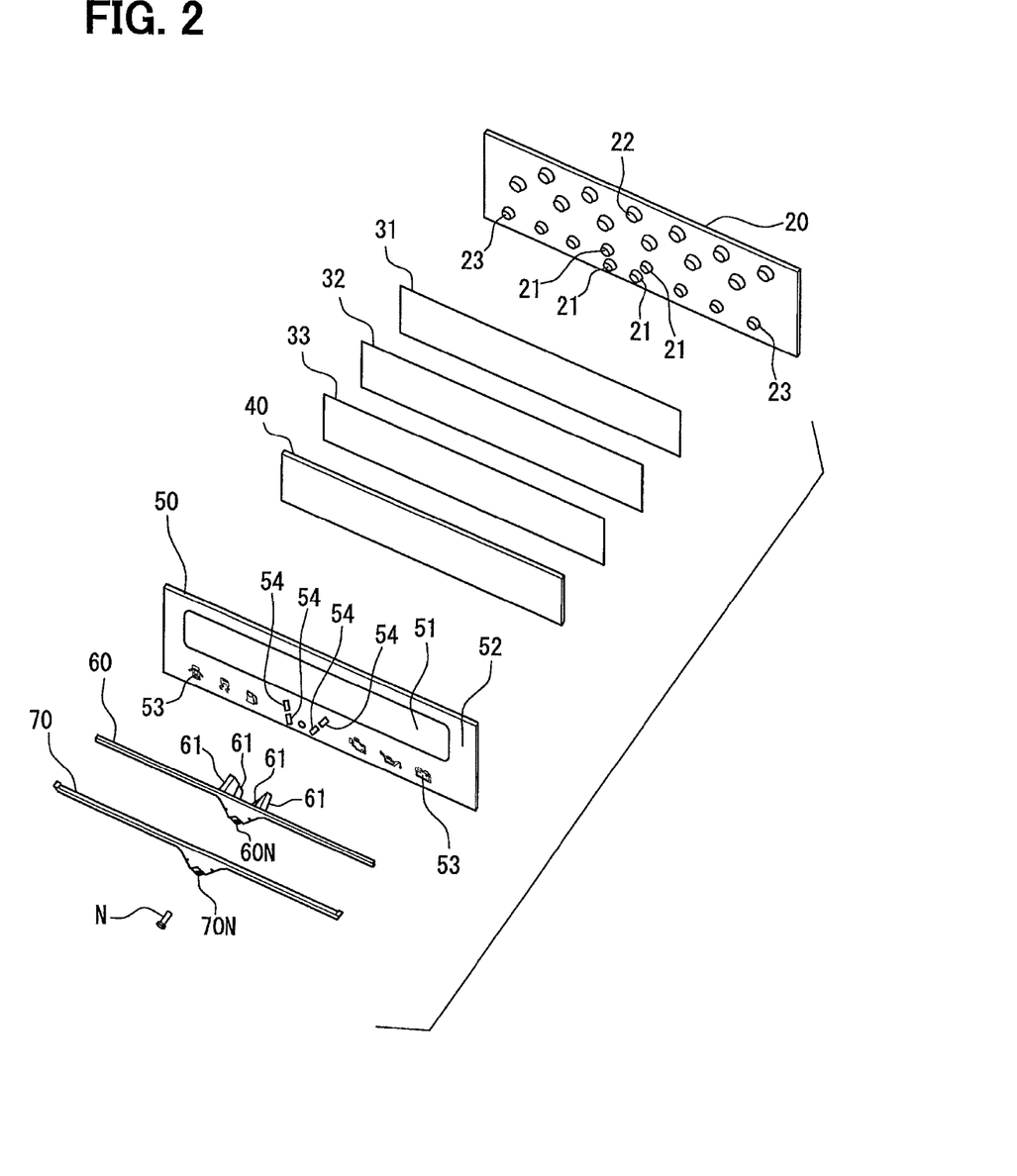
FIG. 2 is an exploded perspective view of the display apparatus in FIG. 1.

With reference to FIG. 2, a circuit board 20, a diffusion plate 31, a directional plates 32 and 33, a liquid crystal display unit 40, a dial plate 50, a light guide member 60, and a cover 70 are assembled to be layered in sequence from the side opposite to the viewer side (i.e., from the rear side to the front side). Thus assembled body is contained in a casing 80 in FIG. 1, providing the display apparatus.

The dial plate 50 is formed of resin with a light transmissive characteristic (i.e., light transmissive resin); the dial plate 50 has a prescribed portion applied with light shielding printing. The dial plate 50 includes a liquid crystal window portion 51 that corresponds to the liquid crystal display portion 10A. The liquid crystal window portion 51 is provided with semi-transmissive printing, through which a display screen of the liquid crystal display unit 40 is viewable. The dial plate 50 includes a plurality of alarm display portions 53 that correspond to the alarm display portion 10B. The alarm display portions 53 are provided with semi-transmissive printing, which the light emitted from the third light sources 23 (which will be explained later) passes through, thereby providing a transmission display. The alarm display portions 53 are formed in shapes illustrating a pattern, a sign, a character representing the alarm contents.

The liquid crystal display unit 40 includes a liquid crystal cell and a pair of deflection plates that sandwich the liquid crystal cell. The liquid crystal cell is filled up with liquid crystal material between a pair of glass substrates having transparent electrodes. The deflection plate deflects the oscillating direction of light into a specified direction to uniform the wave face of the light. Two deflection plates are arranged so as to differentiate the respective deflected directions by an angle of 90 degrees.

The circuit board 20 is mounted with a plurality of first light sources 21, a plurality of second light sources 22, a plurality of third light sources 23, and a microcomputer (unshown). The light sources 21, 22, and 23 use light emitting diodes. The microcomputer controls operations of the liquid crystal display unit 40, the first light sources 21, the second light sources 22, and the third light sources 23 based on acquired vehicle information.

The diffusion plate 31 is formed of resin with a light transmissive characteristic (i.e., light transmissive resin), to transmit and diffuse the light emitted from the first light sources 21. The light diffused by the diffusion plate 31 transmits through the directional plates 32 and 33 so as to be adjusted into directional light before entering the liquid crystal display unit 40. The diffusion effect by the diffusion plate 31 helps prevent the luminance of the light entering the liquid crystal display unit 40 from changing depending on respective positions, enhancing uniformalization of the luminance by reducing luminance unevenness. That is, the light from a plurality of the second light sources 22 is gathering spot lights; in contrast, the light having passed through the diffusion plate 31 provides a surface luminance that illuminates the whole of the surface uniformly.

The directional plates 32 and 33 have surfaces provided with prism patterns that reflect the diffused light into the viewer side or the front direction of the liquid crystal display unit 40. Two directional plates 32 and 33 are arranged so as to orthogonalize two directions in which that the respective prism patterns are arranged. The light diffused by the diffusion plate 31 includes light going outside the angle of visibility of the viewer. Such light outside the angle of visibility can be collected by the directional plates 32 and 33 towards the viewer side; this enhances a luminance intensity in the front view.

The light guide member 60 is attached to the dial plate 50 from the viewer side. The cover 70 is attached to the light guide member 60 from the viewer side. In addition, the light guide member 60 and the cover 70 are provided with through holes 60N and 70N, respectively, in respective central portions. The through holes 60N and 70N receive a screw N, which will be fixedly screwed to the casing 80 via the dial plate 50. This fixes the light guide member 60, which is assembled with the cover 70 (refer to FIG. 3), into the casing 80. In addition, FIG. 2 omits the casing 80.

The following explains the detail of the light guide member 60 and the cover 70 with reference to FIGS. 3 to 8.

Figure 4:
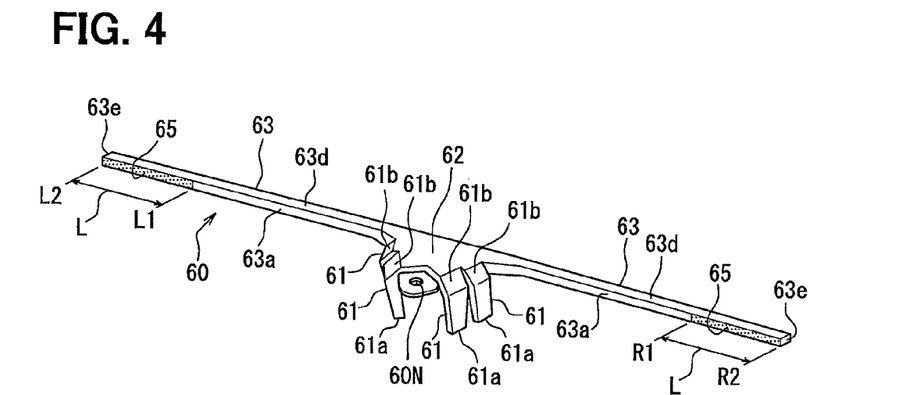
FIG. 4 is a perspective view illustrating a light guide member alone in the display apparatus in FIG. 1.

With reference to FIG. 4, the light guide member 60 includes a light input portion 61, a central portion 62, and an extension portion 63. The light input portion 61, the central portion 62, and the extension portion 63 are formed of light transmissive resin to be molded into an integrated one body. The light input portion 61 is shaped of projecting from the central portion 62 to the circuit board 20 via the through hole 54 of the dial plate 50. The light input portion 61 includes a projection end face that opposes the first light source 21; the projection end face functions as a light input face 61a that receives the light emitted from the first light source 21. The light input portion 61 includes a connection portion that is connected to the central portion 62; the connection portion functions as a reflection face 61b that reflects the light received by the light input face 61a towards the central portion 62. FIG. 4 illustrates an example configuration that provides a plurality of the light input faces 61a and a plurality of the reflection faces 61b. One light input face 61a is provided to correspond to each reflection face 61b and each first light source 21.

Figure 7:
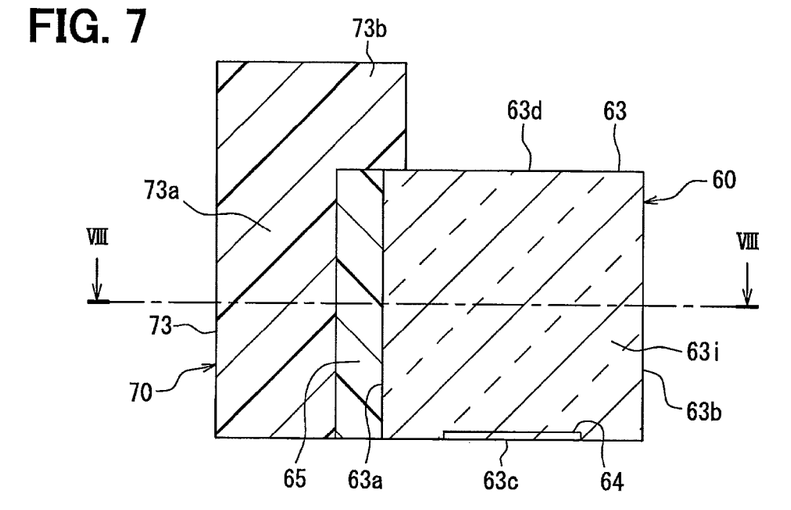
FIG. 7 is a sectional view taken in the line VII-VII in FIG. 6.

The central portion 62 is shaped of a plate widening orthogonally to the viewer direction (i.e., the front direction of the display apparatus, the up-and-down direction in FIG. 4). The light reflected by the reflection face 61b proceeds to an interior portion of the central portion 62 while being repeatedly reflected by the outer faces of the central portion 62, and then enters the extension portion 63. The extension portion 63 is shaped of a bar that is extended in both the left and right directions from the central portion 62. In detail, as illustrated in FIG. 7, the extension portion 63 has a shape having a cross section of rectangle. The light entering the extension portion 63 from the central portion 62 propagates through an interior portion 63i towards a far end face 63e while being repeatedly reflected by outer faces 63a, 63b, 63c, 63d of the extension portion 63.

That is, the light entering the light input portion 61 propagates towards the far end face 63e while being reflected repeatedly by the outer faces including the reflection face 61b of the light input portion 61, the outer faces of the central portion 62, and the outer faces 63a, 63b, 63c, 63d of the extension portion 63.

Furthermore, the light guide member 60 includes a viewable portion 64 and a light absorption member 65. The viewable portion 64 is formed in the outer face 63c among the outer faces 63a, 63b, 63c, 63d of the extension portion 63; the outer face 63c is the rear side opposite to the viewer side. The viewable portion 64 reflects a part of the light propagating through the interior portion 63i towards the viewer side. To be specific, with reference to FIG. 6, the viewable portion 64 is formed in a Fresnel form. Thus, the viewable portion 64 is permitted to appear to be luminous and function as the decorating display portion 10C. The viewable portion 64 is formed also in the central portion 62. Thus, the decorating display portion 10C appears to be a single lateral (left-and-right) linear form that ranges over two left and right extension portions 63 and the central portion 62A (refer to FIGS. 1 and 6).

The light absorption member 65 is formed on the outer face 63a among the outer faces 63a, 63b, 63c, 63d; the outer face 63a is located on the lower side from a viewpoint of the viewer. The light absorption member 65 is formed of material (for example, black resin) having a high light absorption function. To be specific, the light guide member 60 is formed with two-color molding of (i) a high light transmissive resin forming the interior portion 63i and (ii) a high light absorptive resin forming the light absorption member 65. This fixes tightly the light absorption member 65 to the outer face 63c. In addition, the light absorption member 65 may be also referred to as a light attenuation portion (or device/means) to absorb a part of light reflected by the outer face 63a and attenuate the light.

Figure 8:
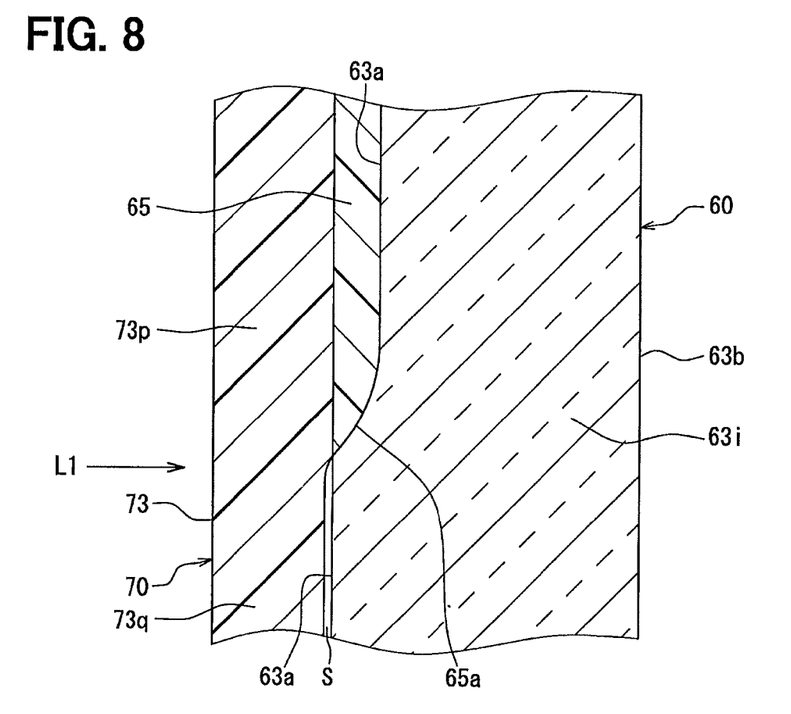
FIG. 8 is a sectional view taken in the line VIII-VIII in FIG. 7.

The viewable portion 64 includes a far end region L (refer to FIG. 4) that is defined as a predetermined region containing a longitudinal far end of path of the light propagating through the interior portion 63i. The light absorption member 65 is formed in the far end region L in each of the left side and the right side (dotted portion in FIG. 4). As illustrated in FIGS. 4 and 7, the light absorption member 65 is arranged to cover the whole of the outer face 63a in the far end region L. As illustrated in FIG. 8, the edge 65a of the light absorption member 65 is formed to appear to be curved and tapered as going towards the central portion 62 (the side of light source) from the viewpoint of the viewer.

Figure 3:
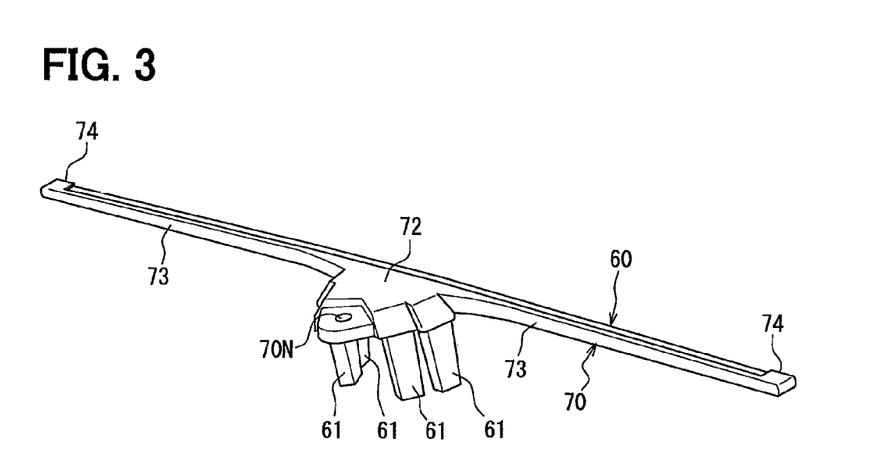
FIG. 3 is a perspective view illustrating a light guide member attached with a cover in the display apparatus in FIG. 1.
Figure 5:
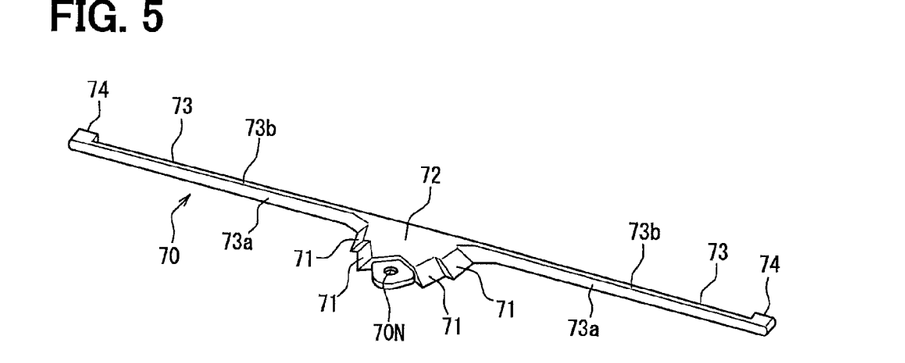
FIG. 5 is a perspective view illustrating a cover alone in the display apparatus in FIG. 1.
Figure 6:
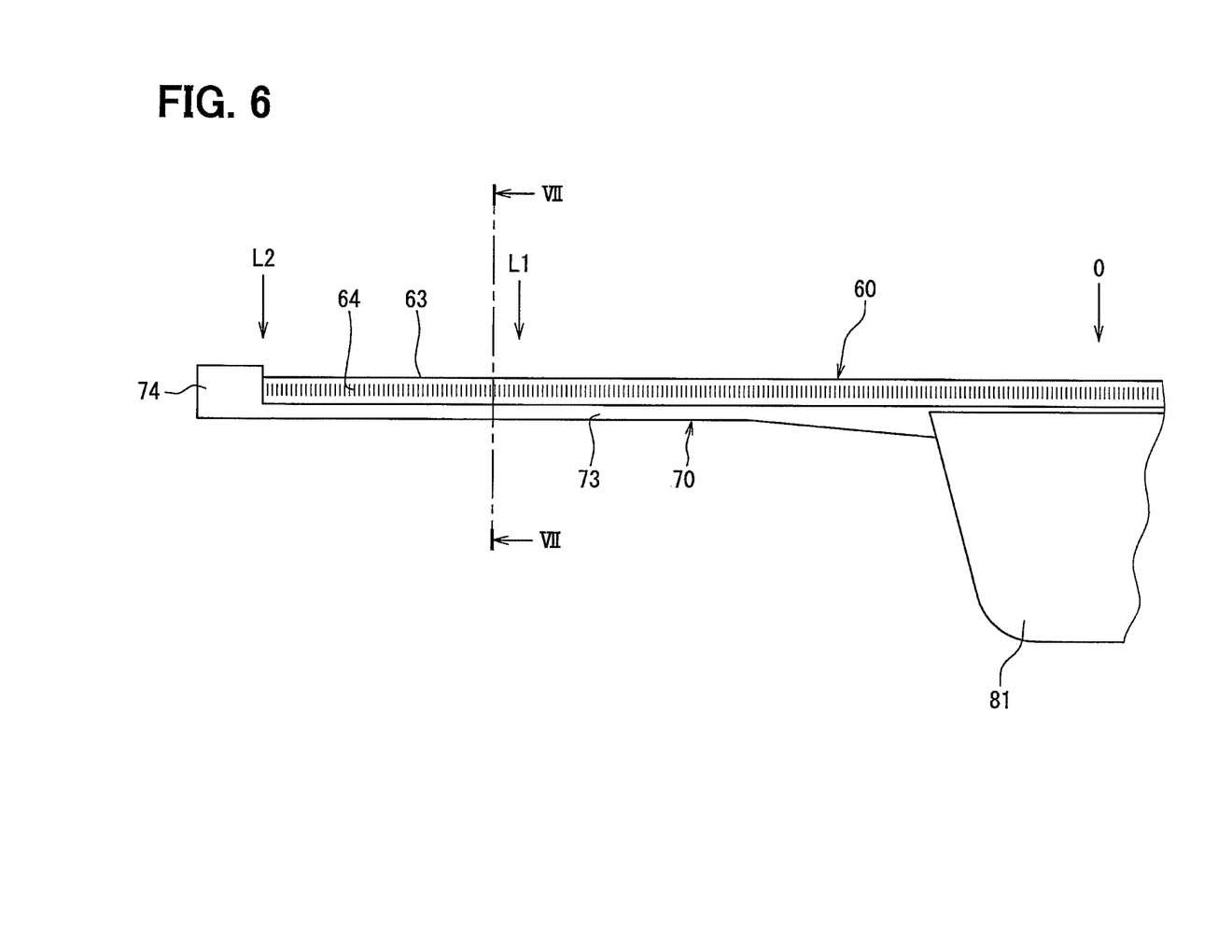
FIG. 6 is a front view from a viewer side, illustrating a light guide member and a cover in the display apparatus in FIG. 1.

As illustrated in FIGS. 1, 3, and 6, the light guide member 60 is attached to the cover 70 formed of resin having high light absorptive color (e.g., black). As illustrated in FIG. 5, the cover 70 includes a reflection face cover portion 71, a central cover portion 72, an extension cover portion 73, and an engagement portion 74. The reflection face cover portion 71 covers the reflection face 61b of the light guide member 60 from the viewer side (from the upper side in FIG. 3). The central cover portion 72 covers the central portion 62 of the light guide member 60 from the viewer side. In addition, the reflection face cover portion 71 and the central cover portion 72 are covered from the viewer side by a blindfolding member 81 (refer to FIGS. 1 and 6) different from the cover 70.

The extension cover portion 73 covers the extension portion 63 of the light guide member 60. To be specific, as illustrated in FIG. 7, the extension cover portion 73 is formed to have a cross section shaped of L having a lower face portion 73a and a front face portion 73b. The lower face portion 73a covers the whole of the light absorption member 65 and the whole of the outer face 63a from the lower side (from the left side in FIG. 7). Thereby, the lower face portion 73a intercepts light so as to prevent the light from leaking from the outer face 63a and spreading downwards from the decorating display portion 10C. The front face portion 73b covers the whole of the light absorption member 65 and a part of the outer face 63d from the viewer side (from the upper side in FIG. 7). Thereby, the front face portion 73b covers the light absorption member 65 to prevent the viewer from seeing it.

The engagement portion 74 covers the far end face 63e of the extension portion 63 and a far end portion of the extension portion 63, which corresponds to the outer faces 63a, 63b, 63c, 63d neighboring the far end face 63e, as illustrated in FIG. 3. Thereby, the engagement portion 74 intercepts light so as to prevent the light from leaking from the far end face 63e and spreading outwards from the decorating display portion 10C.

The engagement portion 74 is engaged with the far end portion of the extension portion 63. Thereby, the extension cover portion 73 is fixed to the extension portion 63; this helps prevent a part of the extension cover portion 73 from vibrating against the extension portion 63 due to vibration of the vehicle. Furthermore, the cover 70 is attached to the light guide member 60 under an elastically-deformed bent state. This permits a contact portion 73p located at a far end of the extension cover portion 73 to be fixed tightly to the whole bottom face (the lower side in FIG. 6) of the light absorption member 65. In contrast, a non-contact portion 73q other than the contact portion 73p of the extension cover portion 73 faces the outer face 63a of the light guide member 60 via an air gap S.

Figure 9:
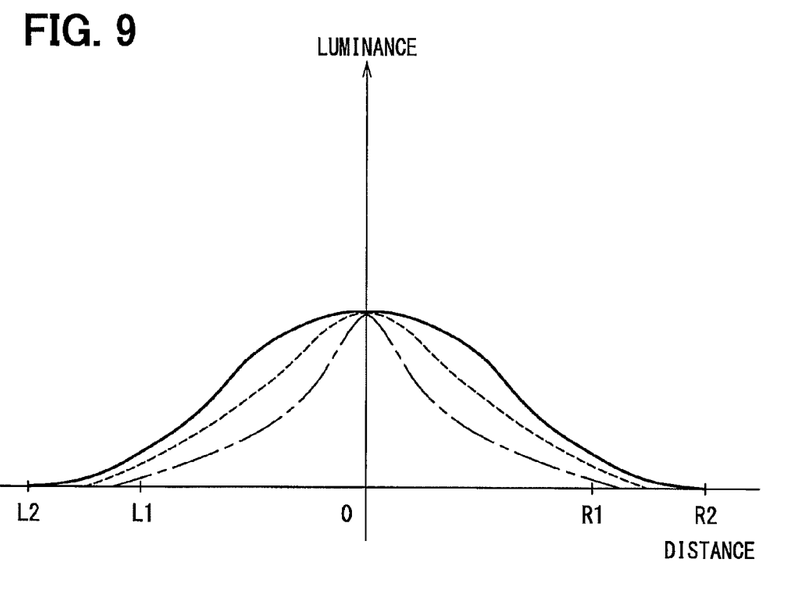
FIG. 9 is a diagram illustrating a luminance change characteristic line representing the relation between a distance from a light source and a luminance in the display apparatus in FIG. 1.

FIG. 9 illustrates a luminance change characteristic line showing the relation between the luminance of the viewable portion 64 (i.e., the decorating display portion 10C) and the left-and-right (i.e., longitudinal) distance from the center position O. The range from the center position O to the sign L1 or the sign R1 corresponds to a range provided with an air gap S. The range between the signs L1, L2 or the signs R1, R2 corresponds to a range where the contact portion 73p of the extension cover portion 73 contacts the extension portion 63 and also corresponds to the range provided with the light absorption member 65.

As known from the drawings, the center position O is closest to the light input face 61a, so that the luminance of the viewable portion 64 is highest in the center position O. As the light propagates towards the far end face 63e through the interior portion 63i, the luminous intensity is attenuated more and the luminance falls. This attenuation is undergone when the light is reflected by the outer faces 63a, 63b, 63c, 63d, and the light propagates through the interior portion 63i. In particular, when the light is reflected by the outer faces 63a, 63b, 63c, 63d, a part of the light leaks into an outside of the light guide member 60, thereby involving the attenuation of the light.

Furthermore, the present embodiment is provided to adjust the luminance change characteristic line into a desired form using the light absorption member 65 and the air gap S. The luminance of the viewable portion 64 falls gradually as the distance from the center position O becomes larger; thus, the decorating display portion 10C provides a gradation display.

The vehicular display apparatus according to the present embodiment provides the following features that exhibit advantageous effects.

<Feature 1>

The light guide member 60 includes the light absorption member 65 (light attenuation portion) which absorbs a part of light reflected by the outer face 63a, which is adjacent to the light absorption member 65, to attenuate or decay the light. Therefore, as illustrated by the solid line in FIG. 10, the luminance falls significantly in the range between the signs L1 to L2 (R1 to R2). The alternate long and short dash line in FIG. 10 illustrates the luminance change characteristic line when the light absorption member 65 is eliminated and replaced by the resin forming the interior portion 63i.

Figure 10:
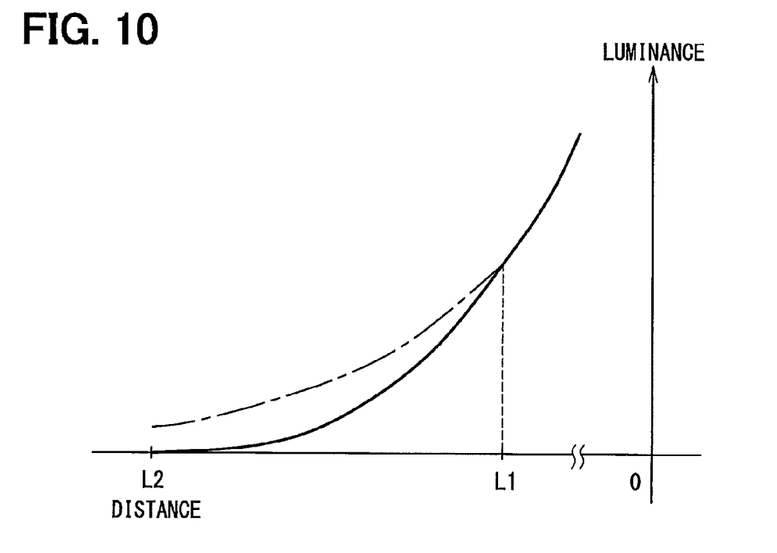
FIG. 10 is an enlarged part of a luminance change characteristic line.

With reference to FIG. 10, the luminance change characteristic line is curved to be convex downwards (towards the lower luminance) in a range provided with the light absorption member 65. The comparison between the solid line and the alternate long and short dash line teaches that the present embodiment providing the light absorption member 65 increases the magnitude of the convex as compared with the case where the light absorption member 65 is eliminated.

In short, the present embodiment provides the light absorption member 65 to thereby reduce the luminance sharply or significantly. The luminance change characteristic line is adjusted into a desired form by adjusting the position or range of the light absorption member 65 or the color of the light absorption member 65; this improves the appearance of the decorating display portion 10C. This is easier than adjusting a luminance change characteristic line only based on the shape of the light guide member.

In addition, according to the present embodiment, a luminance change characteristic line can be adjusted by combining the adjustment of the emitting luminance of the first light source(s) 21 or the shape of the light guide member 60 in addition to the luminance adjustment by the light absorption member 65.

<Feature 2>

The light absorption member 65 (i.e., the light attenuation portion) is provided to oppose the far end region L of the viewable portion 64; the far end region includes a far end of a light path in a longitudinal direction.

In FIG. 10, the solid line of the luminance change characteristic line is formed to be greatly convex downwards in the low luminance region (region L1 to L2, R1 to R2) near a luminance of zero. It is known that the human being's visual perception senses such a great convex as a beautiful gradation display. From such a viewpoint, the present embodiment provides the light absorption member 65 in a portion opposing the far end region L. Thus, the luminance change characteristic line in a low luminance region can be made into a desired form; this enhances the appearance of gradation display.

<Feature 3>

The light guide member 60 is attached to the cover 70 that covers the light guide member 60. Therefore, the light leaking from the light guide member 60 is intercepted by the cover 70; this helps prevent the periphery of the light guide member 60 from appearing to be luminous.

To be specific, the cover 70 includes the reflection face cover portion 71, the central cover portion 72, the extension cover portion 73, and the engagement portion 74. The reflection face cover portion 71 and the central cover portion 72 cover the reflection face 61b and the central portion 62 of the light guide member 60 from the viewer side; this intercepts the light which leaks from the reflection face 61b and the central portion 62 into the viewer side. This helps prevent the reflection face 61b and the central portion 62 from appearing to be luminous. Further, according to the present embodiment, the reflection face cover portion 71 and the central cover portion 72 are further covered by the blindfolding member 81 from the viewer side; this helps prevent the light leaking from the reflection face 61b and the central portion 62 from appearing.

The extension cover portion 73 covers the outer face 63a of the extension portion 63; the outer face 63a is adjacent to the alarm display portion 10B. The light which leaks from the outer face 63a is thus intercepted. This helps prevent the light leakage from the decorating display portion 10C from illuminating the alarm display portion 10B. The engagement portion 74 covers the far end face 63e of the extension portion 63, and intercepts the light which leaks from the far end face 63e. This helps prevent the dial plate 50 in vicinity of the far end face 63e from appearing to be luminous.

<Feature 4>

The light absorption member 65 (i.e., light attenuation portion) is covered by the cover 70 from the viewer side. This hides the light absorption member 65 using the cover 70 for intercepting the light which leaks from the light guide member 60. Compared with the configuration to provide an exclusive cover for the light absorption member 65, the light absorption member 65 can be hidden with a simple structure.

Furthermore, the present embodiment hides the whole of the light absorption member 65 and a part of the outer face 63d using the front face portion 73b of the extension cover portion 73. The front face portion 73b covers a borderline between the high light transmissive resin forming the interior portion 63i and the high light absorptive resin forming the light absorption member 65. The borderline can be certainly screened.

<Feature 5>

The cover 70 includes the contact portion 73p contacting the light absorption member 65 (light attenuation portion), and the non-contact portion 73q forming an air gap S in between the light guide member 60 and the non-contact portion 73q itself. It is noted that if the cover 70 is provided to contact the light guide member 60, such configuration providing a contact portion to the cover 70 absorbs a part of light reflected by the outer face of the light guide member 60. This facilitates the decline of the luminance in the luminance change characteristic line. In contrast, if the cover 70 is provided not to contact the light guide member 60, such configuration does not provide an effect of the decline of the luminance.

With the present embodiment considering this point, the cover 70 is provided to contain the contact portion 73p and the non-contact portion 73q. Adjusting the contact portion 73p and the non-contact portion 73q in positions or ranges facilitates the adjustment of a luminance change characteristic line into a desired form. With reference to FIG. 9, the solid line indicates the present embodiment, where the air gap S enhances the luminance in the range from the center position O to the sign L1 (or sign R1).

In contrast, the dotted line indicates a different configuration different from the present embodiment. The different configuration provides the contact portion 73p over the whole range (L2 to R2) while eliminating any air gap S. That is, the luminance falls in the range other than the range L1 to L2, R1 to R2 having the light absorption member 65. Further, the alternate long and short dash line indicates another different configuration different from the present embodiment. This different configuration provides the light absorption member 65 over the whole range (L2 to R2). That is, the luminance falls over the whole range. The difference in the forms illustrated in the solid line, the dotted line, and the alternate long and short dash line in FIG. 9 signifies that the adjustment of the ranges of the contact portion 73p and the light absorption member 65 permits the adjustment of the form of a luminance change characteristic line with a high accuracy.

<Feature 6>

The light absorption member 65 (i.e., the light attenuation portion) includes the edge 65a on the side closer to the light source; the edge is formed to be curved and tapered. If the light absorption member 65 is formed in a rectangular shape without any curved shape unlike the present embodiment, the light absorption member 65 needs to have a square corner on the side closer to the light source; this square corner causes a partial strong reflection of light. This involves a luminance due to spot light that illuminates a predetermined range centering on the square corner. In contrast, in the present embodiment, the light source-side edge 65a of the light absorption member 65 is formed to be curved and tapered. This configuration helps prevent the occurrence of spot light and the deterioration in appearance due to the spot light.

OTHER EMBODIMENTS

The above embodiment provides the light absorption member 65 (see FIG. 7), which absorbs a part of light reflected by the outer face 63a, as a light attenuation portion. Another configuration may form a diffusing member that diffuses the light on the outer face 63a; this diffusing member may also function as a light attenuation portion.

The above embodiment provides the viewable portion 64 (see FIG. 1) which is formed as a linearly extended bar; the luminance changes gradually in the extending direction or longitudinal direction. Another configuration may form the viewable portion 64 to have a planar (i.e., plate-like) shape widening laterally and longitudinally; the luminance declines gradually as the distance from the light source increases.

The above embodiment provides the cover 70 (see FIG. 6), which has the contact portion in contact with the light guide member 60 and the non-contact portion forming an air gap S in a space between the light guide member 60 and the cover 70 itself. Another configuration may eliminate any non-contact portion while the whole of the cover 70 contacts the light guide member 60.

The above embodiment provides the cover 70 (see FIG. 5) that includes the reflection face cover portion 71, the central cover portion 72, the extension cover portion 73, and the engagement portion 74. Another configuration may provide the cover 70 that includes only the reflection face cover portion 71 and the central cover portion 72 by eliminating the extension cover portion 73 and the engagement portion 74. Moreover, the cover 70 may be eliminated from the configuration of the vehicular display apparatus.

The above embodiment provides the light guide member 60 (see FIG. 7) that is formed of two-color molding of the light absorptive resin and the light transmissive resin. Another configuration may be provided to mold the light transmissive resin and the light absorptive resin separately and adhere the light absorptive resin to the light transmissive resin to form the light guide member 60. Alternatively, the light absorption member 65 may be formed by applying hot stamping, painting, pad printing, etc. to the outer face 63a of the light transmissive resin.

The above embodiment provides the light source-side edge 65a of the light absorption member 65 (see FIG. 8) that is formed to appear to be curved and tapered from the viewer side. Another configuration may provide the light source-side edge 65a of the light absorption member 65 that appears to be curved and tapered from the viewpoint of the dial plate 50 as well as from the viewpoint of the viewer (i.e., from the viewer side). Moreover, such curved form may be abolished.

The above embodiment provides the viewable portion 64 to have a Fresnel form (see FIG. 6). As far as having the function of reflecting the light in the interior portion 63i to the viewer side, the viewable portion 64 according to the present disclosure may not be limited to have a Fresnel form. For example, the viewable portion 64 may be formed by applying surface texturing, hot stamping, pad printing, etc. to the outer face 63c of the light guide member 60.

The above embodiment provides the light absorption member 65 that is formed of black resin. Another configuration may provide the light absorption member 65 formed of resin of color other than black (for example, gray) since the resin forming the light absorption member 65 only need to be colored.

The above embodiment provides the light absorption member 65 (light attenuation portion) on the outer face 63a that is lower side viewed from the viewer side among the outer faces 63a, 63b, 63c, 63d (see FIG. 4). Another configuration may provide a light attenuation portion on the upper outer face 63b. Further, a light attenuation portion may be formed on each of the upper outer face 63b and the lower outer face 63a.

The above embodiment provides the light absorption member 65 (light attenuation portion) in the far end region L (see FIG. 4) of the path of the light. The light attenuation portion may be formed in a middle range of the path of the light.

The above embodiment provides the contact portion 73p and the non-contact portion 73q by attaching the cover 70 to the light guide member 60 in the condition where the cover 70 is bent. Another configuration may provide the contact portion 73p and the non-contact portion 73q by forming the non-contact portion 73q to be thinner in the up-and-down direction (left-right direction in FIG. 8) than the contact portion 73p. Such configuration eliminates the need of the cover 70 being bent.

The above embodiment provides the light absorption member 65 in the far end region L that is identical to the region where the contact portion 73p is formed. Another configuration may provide the border line between the contact portion 73p and the non-contact portion 73q in a middle of the far end region L. This can provide the following advantageous effects. That is, if the border line is located outside of the far end region L, the range exhibiting a high luminance due to the air gap S changes in respective products since the border line varies depending on the deviations in the products. This leads to the change of the form of the luminance change characteristic line. In contrast, suppose the case where the border line is located in a middle of the far end region L. In such a case, even if the above-mentioned deviations in products arise, there is no change in that the range other than the far end region L exhibits a high luminance due to the air gap S. This helps prevent the form of the luminance change characteristic line from being different depending on the respective products.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicular display apparatus in a vehicle, comprising:
   a light source; and
   a light guide member that is linearly extended, the light guide member including
      an interior portion that receives light from the light source, and
      outer faces that reflect the light repeatedly to permit the reflected light to propagate in the interior portion,
   the light guide member further including:
      a viewable portion that reflects a part of the light propagating in the interior portion towards a viewer side so as to appear to be luminous, and
      a light absorption member serving as a light attenuation portion that absorbs the light reflected by the outer faces,
   wherein:
      the viewable portion is provided on the outer face that is located on a side opposite to the viewable side of the light guide member; and
      the light absorption member is provided on the outer face that is located on a lower side of the light guide member, only in a far end of a path of the light propagating through the interior portion of the light guide member that is linearly extended.

2. The vehicular display apparatus according to claim 1, wherein
the light guide member is provided to receive a cover that covers the outer face.

3. The vehicular display apparatus according to claim 2, wherein
the cover hides the light absorption member from the viewer side.

4. The vehicular display apparatus according to claim 2, wherein
the cover includes a contact portion that contacts the light absorption member and a non-contact portion that faces the light guide portion via an air gap.

5. The vehicular display apparatus according to claim 1, wherein
the light absorption member includes an edge on a side closer to the light source, the edge being formed to be curved and tapered.

6. The vehicular display apparatus according to claim 1, further comprising:
a liquid crystal display portion;
an alarm display portion provided to be below the liquid crystal display portion; and
a decorating display portion provided to be between the liquid crystal display portion and the alarm display portion and linearly extending along a left and right direction of the vehicular display apparatus to output light, wherein:
the decorating display portion includes the light guide member;
the light guide member receives the light from the light source at a center position in a left and right direction of the vehicular display apparatus; and
the light, which is received at the center position of the light guide member, propagates through the interior portion in the left and right direction towards each end of both ends of the left and right direction and is attenuated at each end of the both ends by the light absorption member.

7. A vehicular display apparatus in a vehicle, comprising:
a light source; and
a light guide member including
an interior portion that receives light from the light source, and
outer faces that reflect the light repeatedly to permit the reflected light to propagate in the interior portion,
the light guide member further including:
a viewable portion that reflects a part of the light propagating in the interior portion towards a viewer side so as to appear to be luminous, and
a light attenuation portion that absorbs or diffuses the light reflected by the outer faces,
wherein:
the light guide member is provided to receive a cover that covers the outer face; and
the cover hides the light attenuation portion from the viewer side.

8. The vehicular display apparatus according to claim 7, wherein
the light attenuation portion is provided to oppose a far end region of the viewable portion, the far end region containing a far end of a path of the light.

9. The vehicular display apparatus according to claim 7, further comprising:
a liquid crystal display portion;
an alarm display portion provided to be below the liquid crystal display portion; and
a decorating display portion provided to be between the liquid crystal display portion and the alarm display portion and linearly extending along a left and right direction of the vehicular display apparatus to output light, wherein:
the decorating display portion includes the light guide member;
the light guide member receives the light from the light source at a center position in a left and right direction of the vehicular display apparatus; and
the light, which is received at the center position of the light guide member, propagates through the interior portion in the left and right direction towards each end of both ends of the left and right direction and is attenuated at each end of the both ends by the light attenuation portion.

10. A vehicular display apparatus in a vehicle, comprising:
a light source; and
a light guide member including
an interior portion that receives light from the light source, and
outer faces that reflect the light repeatedly to permit the reflected light to propagate in the interior portion,
the light guide member further including:
a viewable portion that reflects a part of the light propagating in the interior portion towards a viewer side so as to appear to be luminous, and
a light attenuation portion that absorbs or diffuses the light reflected by the outer faces,
wherein:
the light guide member is provided to receive a cover that covers the outer face; and
the cover includes a contact portion that contacts the light attenuation portion and a non-contact portion that faces the light guide portion via an air gap.

11. The vehicular display apparatus according to claim 10, wherein
the light attenuation portion is provided to oppose a far end region of the viewable portion, the far end region containing a far end of a path of the light.

12. The vehicular display apparatus according to claim 10, further comprising:
a liquid crystal display portion;
an alarm display portion provided to be below the liquid crystal display portion; and
a decorating display portion provided to be between the liquid crystal display portion and the alarm display portion and linearly extending along a left and right direction of the vehicular display apparatus to output light, wherein:
the decorating display portion includes the light guide member;
the light guide member receives the light from the light source at a center position in a left and right direction of the vehicular display apparatus; and
the light, which is received at the center position of the light guide member, propagates through the interior portion in the left and right direction towards each end of both ends of the left and right direction and is attenuated at each end of the both ends by the light attenuation portion.

13. A vehicular display apparatus in a vehicle, comprising:
a light source; and
a light guide member including
an interior portion that receives light from the light source, and outer faces that reflect the light repeatedly to permit the reflected light to propagate in the interior portion, the light guide member further including:
- a viewable portion that reflects a part of the light propagating in the interior portion towards a viewer side so as to appear to be luminous, and
- a light attenuation portion that absorbs or diffuses the light reflected by the outer faces, wherein the light attenuation portion includes an edge on a side closer to the light source, the edge being formed to be curved and tapered.

14. The vehicular display apparatus according to claim 13, wherein the light attenuation portion is provided to oppose a far end region of the viewable portion, the far end region containing a far end of a path of the light.

15. The vehicular display apparatus according to claim 13, further comprising:

a liquid crystal display portion;

an alarm display portion provided to be below the liquid crystal display portion; and a decorating display portion provided to be between the liquid crystal display portion and the alarm display portion and linearly extending along a left and right direction of the vehicular display apparatus to output light, wherein:

the decorating display portion includes the light guide member;

the light guide member receives the light from the light source at a center position in a left and right direction of the vehicular display apparatus; and the light, which is received at the center position of the light guide member, propagates through the interior portion in the left and right direction towards each end of both ends of the left and right direction and is attenuated at each end of the both ends by the light attenuation portion.

* * * * *